United States Patent
Maiman et al.

(10) Patent No.: US 12,086,807 B2
(45) Date of Patent: *Sep. 10, 2024

(54) USER AUTHENTICATION BASED ON ACCOUNT TRANSACTION INFORMATION IN TEXT FIELD

(71) Applicant: Capital One Services, LLC, McLean, VA (US)

(72) Inventors: Tyler Maiman, Melville, NY (US); David Septimus, New York, NY (US); Samuel Rapowitz, Roswell, GA (US); Jenny Melendez, Falls Church, VA (US); Viraj Chaudhary, Katy, TX (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,736

(22) Filed: Aug. 31, 2023

(65) Prior Publication Data

US 2024/0062211 A1     Feb. 22, 2024

Related U.S. Application Data

(63) Continuation of application No. 17/387,683, filed on Jul. 28, 2021, now Pat. No. 11,775,973.

(51) Int. Cl.
*G06Q 20/40* (2012.01)
*G06F 18/214* (2023.01)
*G06N 20/20* (2019.01)

(52) U.S. Cl.
CPC ....... *G06Q 20/4015* (2020.05); *G06F 18/214* (2023.01); *G06N 20/20* (2019.01);
(Continued)

(58) Field of Classification Search
CPC .......... G06Q 20/4015; G06Q 20/4012; G06Q 20/405; G06Q 20/4097; G06Q 20/4014;
(Continued)

(56) References Cited

U.S. PATENT DOCUMENTS

| | | | |
|---|---|---|---|
| 10,601,800 B2 * | 3/2020 | Kao | H04L 63/102 |
| 2015/0332265 A1 * | 11/2015 | Perry | C08G 18/14 |
| | | | 705/44 |

(Continued)

FOREIGN PATENT DOCUMENTS

| | | | | |
|---|---|---|---|---|
| EP | 3893142 A1 * | 10/2021 | ......... | G06F 16/3329 |
| WO | WO-2020023003 A1 * | 1/2020 | ........... | G06F 21/554 |

*Primary Examiner* — Patrick McAtee
*Assistant Examiner* — Vincent I Idiake
(74) *Attorney, Agent, or Firm* — Banner & Witcoff, Ltd.

(57) ABSTRACT

Methods, systems, and apparatuses are described herein for authenticating access to an account using questions which allow users to provide textual information about transactions conducted by an account. A machine learning model may be trained to predict the guessability of merchants. A request for access to an account may be received, and transaction data for that account may be received. An authentication question may be presented. For example, a user may be prompted to list places they have shopped recently. A user response comprising text data may be received. The text data may be processed to identify one or more merchants. If the one or more merchant(s) are represented in the transaction data, the machine learning model may be used to determine the guessability of the one or more merchants. An authentication score may be determined based on the guessability, and access to the account may be provided.

20 Claims, 6 Drawing Sheets

(52) U.S. Cl.
CPC ....... *G06Q 20/4012* (2013.01); *G06Q 20/405* (2013.01); *G06Q 20/4097* (2013.01)

(58) Field of Classification Search
CPC ...... G06F 18/214; G06N 20/20; G06N 3/044; G06N 3/0464; G06N 3/09
See application file for complete search history.

(56) References Cited

U.S. PATENT DOCUMENTS

| | | | |
|---|---|---|---|
| 2018/0047025 A1* | 2/2018 | Anderson | G06Q 20/388 |
| 2021/0025995 A1* | 1/2021 | Slobodyanyuk | G01S 7/4802 |
| 2021/0297422 A1* | 9/2021 | McDorman | H04L 63/107 |
| 2021/0336949 A1* | 10/2021 | Kohli | H04L 12/06 |
| 2022/0067690 A1* | 3/2022 | Nair | G06Q 20/40 |
| 2022/0253856 A1* | 8/2022 | Wong | G06N 3/088 |
| 2022/0350917 A1* | 11/2022 | Cuan | G06F 21/6227 |

\* cited by examiner

Please name, in the text box below, some of the stores you've shopped at recently.

Authentication Question
(501)

SUBMIT

"Last week I shopped at Joe's Crabs, Bob's, and Smith's Grocery"

Text Data
(502)

| Joe's Crab Shack LLC | Bob's Convenience, Inc. |

Processed Text Data
(503)

| July 10 | $60 Purchase at Mike's Brewery |
| July 11 | $15 Purchase at Bob's Convenience |
| July 12 | $100 Purchase at Oliver's Garage |

...

Transaction Data
(504)

Bob's Convenience, Inc.
↓
| July 11 | $15 Purchase at Bob's Convenience |

Correlation between Merchant and Transaction
(505)

FIG. 5

USER AUTHENTICATION BASED ON ACCOUNT TRANSACTION INFORMATION IN TEXT FIELD

CROSS REFERENCE TO RELATED APPLICATIONS

This application is a continuation of U.S. patent application Ser. No. 17/387,683, filed Jul. 28, 2021, titled User Authentication Based on Account Transaction Information in Text Field. The contents of the above listed application is expressly incorporated herein by reference in its entirety for any and all non-limiting purposes.

FIELD OF USE

Aspects of the disclosure relate generally to account security. More specifically, aspects of the disclosure may provide for improvements in the method in which authentication questions are presented and processed.

BACKGROUND

As part of determining whether to grant a user access to content (e.g., as part of determining whether to provide a caller access to a telephone system that provides banking information), a user of the user device may be prompted with one or more authentication questions. Such questions may relate to, for example, a password of the user, a personal identification number (PIN) of the user, or the like. Those questions may additionally and/or alternatively be generated based on personal information of the user. For example, when setting up an account, a user may provide a variety of answers to predetermined questions (e.g., "Where was your father born?," "Who was your best friend in high school?"), and those questions may be presented to the user as part of an authentication process. As another example, a commercially-available database of personal information may be queried to determine personal information for a user (e.g., their birthdate, birth state, etc.), and that information may be used to generate an authentication question (e.g., "Where were you born, and in what year?").

As part of authenticating a computing device, information about financial transactions conducted by a user of that computing device may be used to generate authentication questions as well. For example, a user may be asked questions about one or more transactions conducted by the user in the past (e.g., "Where did you get coffee yesterday?," "How much did you spend on coffee yesterday?," or the like). Such questions may prompt a user to provide a textual answer (e.g., by inputting an answer in a text field), to select one of a plurality of answers (e.g., select a single correct answer from a plurality of candidate answers), or the like. In some instances, the user may be asked about transactions that they did not conduct. For example, a computing device may generate a synthetic transaction (that is, a fake transaction that was never conducted by a user), and ask a user to confirm whether or not they conducted that transaction. Authentication questions can be significantly more useful when they can be based on either real transactions or synthetic transactions: after all, if every question related to a real transaction, a nefarious user could use personal knowledge of a legitimate user to guess the answer, and/or the nefarious user may be able to glean personal information about the legitimate user.

While authentication questions may be presented in a multiple-choice format (e.g., where a user selects one or more options from a plurality of predetermined options), this format can unintentionally provide malicious users guessing opportunities and/or hints about account details. For example, if a malicious user knows that at least one answer for every authentication question is correct, then they may be able to brute force an authentication process by simply guessing correctly. As a more extreme example, if a malicious user knows that at least one answer for every authentication question is correct, then the malicious user may be able to, over time, learn sensitive information about an account. Over time, a malicious user may thereby be able to profile user(s) of the account, such that they may have a better shot at guessing the answer to authentication questions.

Aspects described herein may address these and other problems, and generally improve the safety of financial accounts and computer transaction systems by providing and processing (e.g., using a machine learning model) more free-form and open-ended authentication questions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improvements in the manner in which authentication questions are used to control access to accounts. The improvements described herein relate to generating and using authentication questions which allow users to provide answers in a free and/or narrative format, such as by typing textual content using their personal computer and/or speaking out their answers over a telephone call. For example, in response to an authentication question such as "Where have you shopped recently?" a user may enter, into a text entry field, "I recently shopped at Joe's" or simply "Joe's." As will be described further herein, these answers may be processed to, e.g., identify one or more merchants (e.g., "Joe's" corresponding to "Joe's Convenience Store, LLC"). If the one or more merchants match transaction data associated with an account (e.g., if the account was used to shop at "Joe's Convenience Store, LLC" recently, such that the user answered correctly), a machine learning model may be used to determine a guessability of the one or more merchants. For example, the machine learning model may output an indication of whether a malicious user could easily guess "Joe's" due to its popularity, simple name, or the like. Then, based on that guessability (and, e.g., whether the user answered correctly), an authentication score may be determined, and a user may be provided access to an account.

More particularly, some aspects described herein may provide for a computing device that may train a machine learning model to predict a guessability of an input merchant by providing, to the machine learning model, training data indicating a popularity of various merchants. The training data may indicate the popularity of various merchants in different geographic regions. The input data provided to the training model might then indicate a first geographic region corresponding to an account such that, for example, the trained machine learning model might predict a popularity of one or more merchants in the first geographic region.

The computing device may receive, from a user device, a request for access to an account. The computing device may receive transaction data associated with the account. That transaction data may indicate a plurality of transactions. Each transaction of the plurality of transactions may be associated with a merchant. The computing device may present, to the user device, an authentication question that prompts a user to identify one or more merchants indicated by the transaction data. The computing device may receive, from the user device and in response to the authentication question, a user response comprising text data, and may process the text data to identify at least one merchant. The computing device may then, based on determining that at least one transaction of the plurality of transactions is associated with the at least one merchant, provide, to the trained machine learning model, input data indicating the at least one merchant. The computing device may receive, from the trained machine learning model and in response to the input data, output data indicating a guessability of the at least one merchant. The computing device may then generate, based on the output data, an authentication score; and provide, to the user device and based on the authentication score, access to the account.

According to some embodiments, the computing device may generate the authentication score by providing, as input to a second machine learning model trained to generate a uniqueness factor for an input merchant, second input data comprising a first indication of the at least one merchant and a second indication of one or more other merchants. The computing device may then generate the authentication score further based on the uniqueness factor. Additionally and/or alternatively, the computing device may generate the authentication score by determining a commonality factor that indicates a frequency of transactions, by a plurality of different users, with the at least one merchant, then discounting the authentication score based on the commonality factor. Additionally and/or alternatively, the computing device may provide a text input field along with the authentication question, such that the user response is received via the text input field. Additionally and/or alternatively, the computing device may process the text data to identify a second merchant, then discount the authentication score based on determining that the second merchant does not match the transaction data. Additionally and/or alternatively, the computing device may process the text data to identify a second merchant, then, based on determining that the second merchant provides a delivery service, exclude the second merchant from influencing the authentication score. Additionally and/or alternatively, the computing device may determine that a past user response comprised an indication of the at least one merchant, then prompt the user device for an additional merchant different from the at least one merchant. Additionally and/or alternatively, the computing device may further provide, to the user device, a second authentication question that prompts the user to identify one or more merchants not indicated by the transaction data, then receive, from the user device and in response to the second authentication question, a second user response comprising second text data. Then, the computing device may process the text data to identify a second merchant and, based on determining that the second merchant is not associated with any transactions indicated by the transaction data, determine a commonality factor indicating a relative frequency of transactions, by all users, with the second merchant and increase the authentication score based on the commonality factor.

Corresponding methods, apparatuses, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5 depicts an authentication question, text data received in response to the text data, a processed version of the text data, transaction data, and an association between a transaction and a merchant indicated in the processed text data.

DETAILED DESCRIPTION

Figure 1:
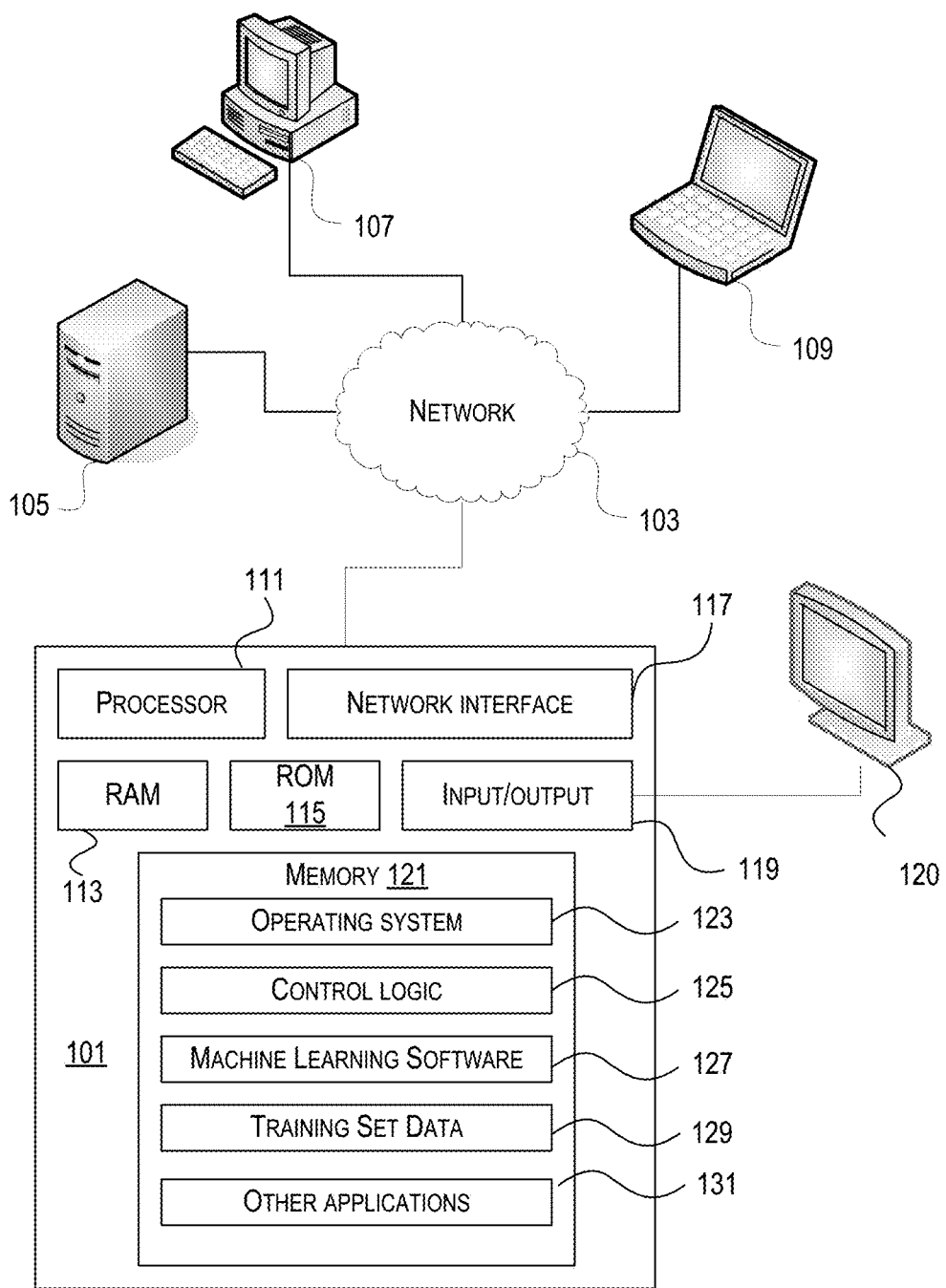
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving authentication questions used during an authentication process. In particular, the process depicted herein may receive, in response to an authentication question (e.g., "Where did you shop last week?"), textual content, such as text entered into a text field of a user interface (e.g., "Joe's, Bagel Stop, Sandwich Shack"). That textual content may be processed to identify merchants (e.g., "Joe's Convenience Store, LLC," "Bagel Stop Inc.," "Sandwich Shack"), and those identified merchants may be compared to transactions in transaction data for an account. If at least one of the identified merchants corresponds to a transaction indicated in the transaction data (e.g., if a user correctly identifies a merchant where they have recently shopped), then a machine learning model may be used to determine the guessability of the at least one of the identified merchants. That guessability may be related to a potential popularity of the merchant. After all, for example, a malicious actor may easily be able to correctly guess that most accounts have been used to purchase items at popular online stores and/or coffee shops. Then, based on that guessability (and, e.g., based on the user answering one or more merchants correctly), an authentication score may be determined, and access to an account may be provided. For example, if a user correctly indicates a merchant where an account has been recently used, and if that merchant is not easily guessed, then the user may be provided access to the account. As another example, if a user correctly indicates a merchant where an account has been recently used, but the merchant is easily guessed by a malicious user (e.g., because the merchant is very popular in a geographic region where the account is located), then the user may be required to answer additional authentication questions before being provided access to the account.

As an example of one problem addressed by the current disclosure, an authentication system may generate and present authentication questions that ask a user to select, from various predetermined answers, merchants where they have recently shopped. This approach has a significant weakness: because the answers are predetermined (and, e.g., at least one is correct), a malicious user might be able to guess answers correctly. Moreover, this style of authentication question can additionally and/or alternatively unintentionally tip off malicious users to information about the account: if at least one answer to an authentication question is always correct, then malicious users may be capable of learning sensitive information about an account over time, and thereby may be able to better guess answers to authentication questions in the future. These problems can introduce significant insecurities in the authentication process: if a malicious user can guess their way into account access and/or can, over time, teach themselves about an account and thereby better guess their way through subsequent authentication processes for that account, the malicious user may ultimately gain unauthorized access to the account.

Aspects described herein improve the functioning of computers by improving the way in which computers provide authentication questions and protect computer-implemented accounts. The speed and processing complexity of computing devices allows them to present more complicated authentications than ever before, which advantageously can improve the security of sensitive account information. That said, the algorithms with which authentication questions are generated can have security holes, which may render those authentication questions undesirably vulnerable to exploitation. Such exploitation can result in the illegitimate use and abuse of computer resources. The processes described herein improve this process by prompting users to provide free text (rather than, e.g., predetermined answers), then processing that free text (using, e.g., a machine learning model) for both correctness and guessability. Such steps cannot be performed by a user and/or via pen and paper at least because the problem is fundamentally rooted in computing processes, involves a significantly complex amount of data and information processing, and requires steps (e.g., natural language processing, use of a machine learning model) which cannot be performed by a human being. For example, because knowledge of businesses is often localized (e.g., many businesses exist only in certain locations, some businesses are more popular or otherwise well-known in some locations than others, etc.), large amounts of data may be collected, processed, and used to generate models (e.g., machine learning models) that can quickly authenticate various users while taking local conditions and knowledge into account. Thus, human users cannot possibly perform the type of large-scale data processing that may be used in implementing techniques described herein.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
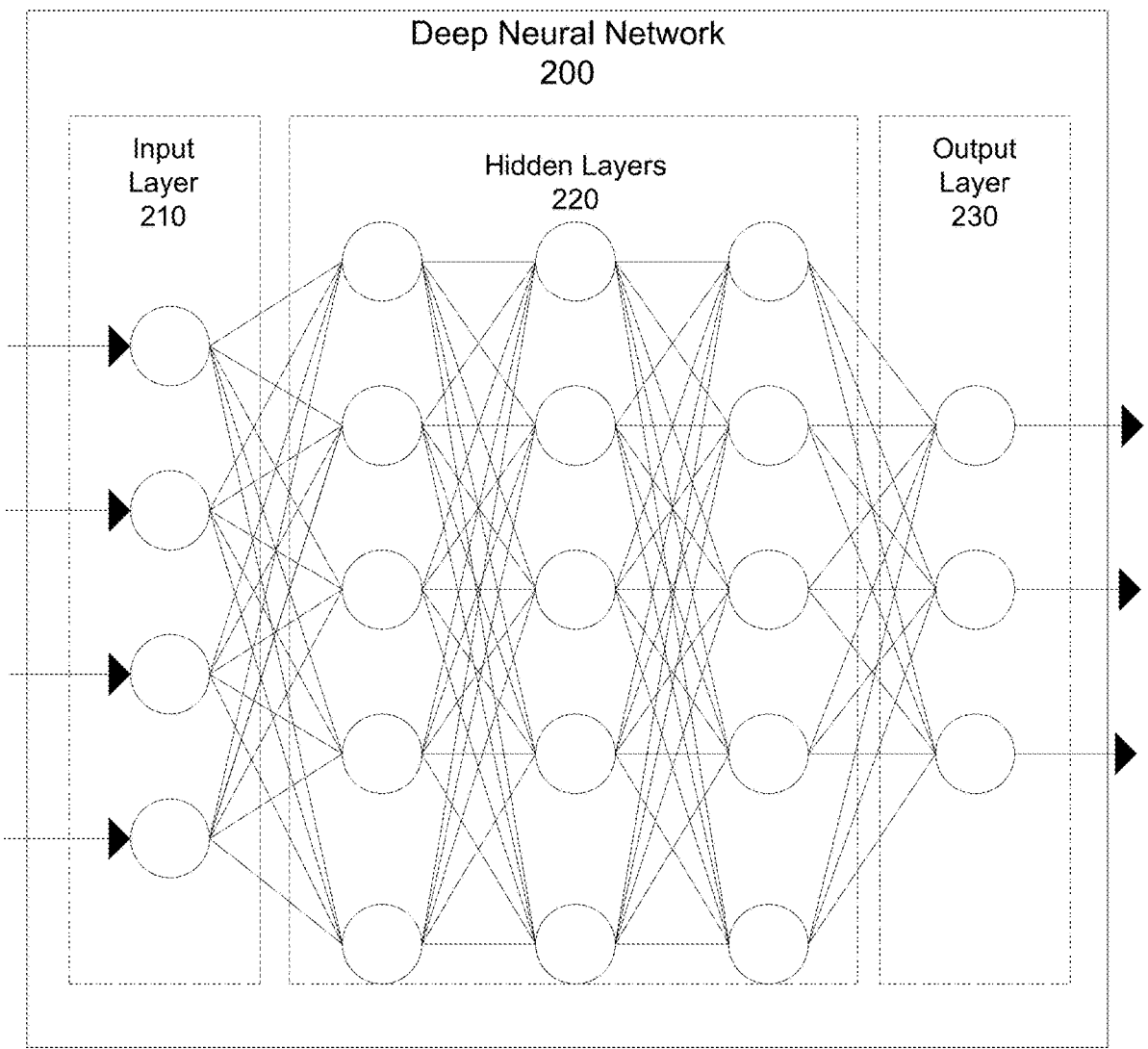
FIG. 2 depicts an example deep neural network architecture for a model according to one or more aspects of the disclosure.

FIG. 2 illustrates an example deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
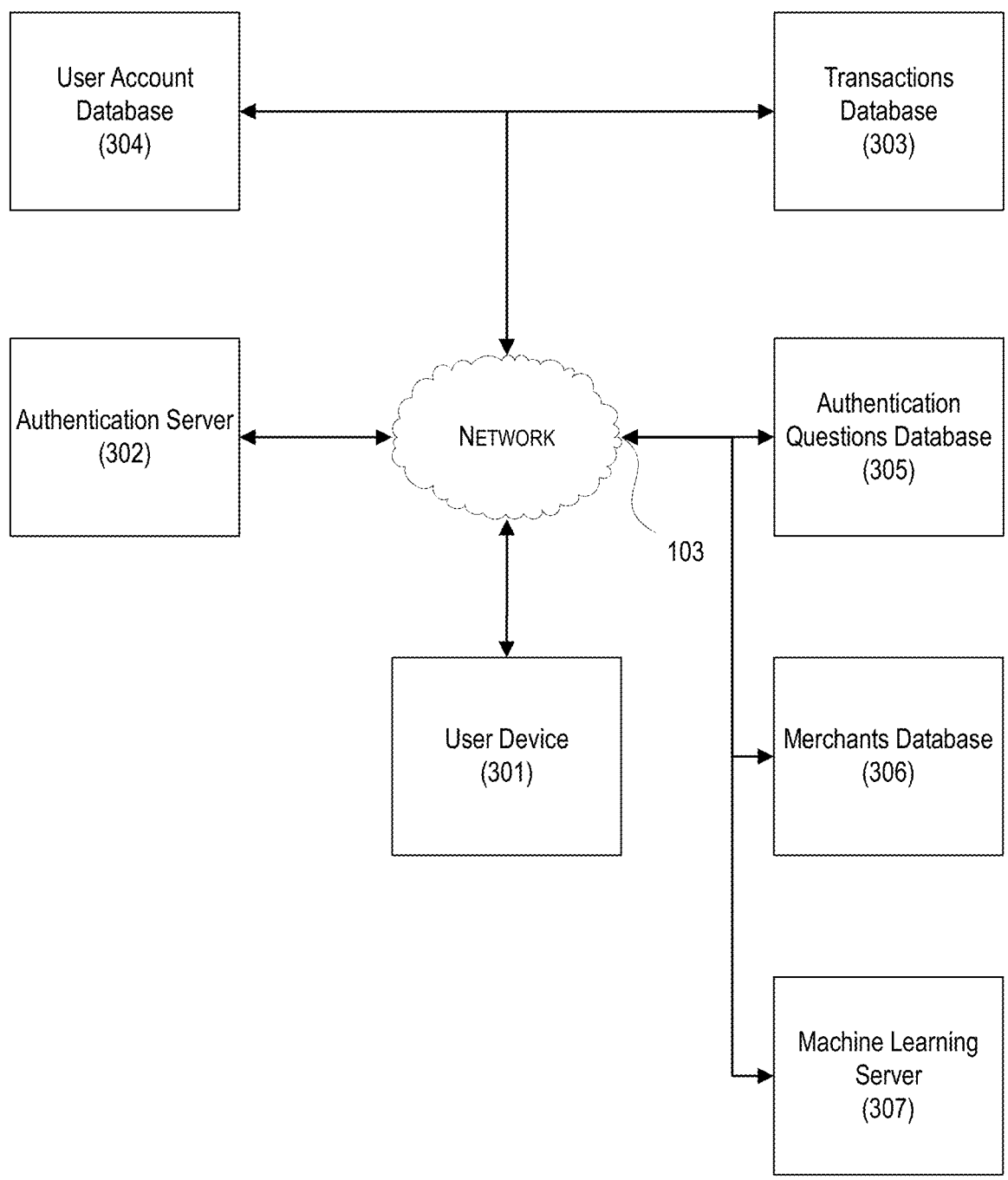
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302, a transactions database 303, a user account database 304, an authentication questions database 305, a merchants database 306, and a machine learning server 307. The network 103 may be the same or similar as the network 103 of FIG. 1. Each of the user device 301, the authentication server 302, the transactions database 303, the user account database 304, the authentication questions database 305, the merchants database 306, and/or the machine learning server 307 may be one or more computing devices, such as a computing device comprising one or more processors and memory storing instructions that, when executed by the one or more processors, perform one or more steps as described further herein. For example, any of those devices may be the same or similar as the computing devices 101, 105, 107, and 109 of FIG. 1.

As part of an authentication process, the user device 301 may communicate, via the network 103, to access the authentication server 302 to request access (e.g., to a user account). The user device 301 shown here may be a smartphone, laptop, or the like, and the nature of the communications between the two may be via the Internet, a phone call, or the like. For example, the user device 301 may access a website associated with the authentication server 302, and the user device 301 may provide (e.g., over the Internet and by filling out an online form) candidate authentication credentials to that website. The authentication server 302 may then determine whether the authentication credentials are valid. For example, the authentication server 302 may compare the candidate authentication credentials received from the user device 301 with authentication credentials stored by the user account database 304. In the case where the communication is telephonic, the user device 301 need not be a computing device, but may be, e.g., a conventional telephone.

The user account database 304 may store information about one or more user accounts, such as a username, password, demographic data about a user of the account, or the like. For example, as part of creating an account, a user may provide a username, a password, and/or one or more answers to predetermined authentication questions (e.g., "What is the name of your childhood dog?"), and this information may be stored by the user account database 304. The authentication server 302 may use this data to generate authentication questions. The user account database 304 may store demographic data about a user, such as their age, gender, location, occupation, education level, income level, and/or the like.

The transactions database 303 may comprise data relating to one or more transactions conducted by one or more financial accounts associated with a first organization. For example, the transactions database 303 may maintain all or portions of a general ledger for various financial accounts associated with one or more users at a particular financial institution. The data stored by the transactions database 303 may indicate one or more merchants (e.g., where funds were spent), an amount spent (e.g., in one or more currencies), a date and/or time (e.g., when funds were spent), or the like. The data stored by the transactions database 303 may be generated based on one or more transactions conducted by one or more users. For example, a new transaction entry may be stored in the transactions database 303 based on a user purchasing an item at a store online and/or in a physical store. As another example, a new transaction entry may be stored in the transactions database 303 based on a recurring charge (e.g., a subscription fee) being charged to a financial account. As will be described further below, synthetic transactions may be based, in whole or in part, on legitimate transactions reflected in data stored by the transactions database 303. In this way, the synthetic transactions may better emulate real transactions.

The account data stored by the user account database 304 and the transactions database 303 may, but need not be related. For example, the account data stored by the user account database 304 may correspond to a user account for a bank website, whereas the financial account data stored by the transactions database 303 may be for a variety of financial accounts (e.g., credit cards, checking accounts, savings accounts) managed by the bank. As such, a single user account may provide access to one or more different financial accounts, and the accounts need not be the same. For example, a user account may be identified by a username and/or password combination, whereas a financial account may be identified using a unique number or series of characters.

The authentication questions database 305 may comprise data which enables the authentication server 302 to present authentication questions. An authentication question may be any question presented to one or more users to determine whether the user is authorized to access an account. For example, the question may be related to personal information about the user (e.g., as reflected by data stored in the user account database 304), may be related to past transactions of the user (e.g., as reflected by data stored by the transactions database 303), or the like. The authentication questions database 305 may comprise data for one or more templates which may be used to generate an authentication question based on real information (e.g., from the user account database 304 and/or the transactions database 303) and/or based on synthetic information (e.g., synthetic transactions which have been randomly generated and which do not reflect real transactions). The authentication questions database 305 may additionally and/or alternatively comprise one or more static authentication questions, such as an authentication question that is used for a wide variety of users (e.g., "Where did you recently shop?"). An authentication question may correspond to a synthetic transaction (e.g., a transaction which never occurred). For example, a synthetic transaction indicating a $10 purchase at a coffee shop on Wednesday may be randomly generated, and the authentication question could be, e.g., "Where did you spent $10 last Wednesday?," "How much did you spend at the coffee shop last Wednesday?," or the like. In all such questions, the correct answer may indicate that the user never conducted the transaction. As part of generating authentication questions based on synthetic transactions, merchants may be randomly selected from a list of merchants stored by the merchants database 306. Additionally and/or alternatively, as part of generating such authentication questions based on synthetic transactions, real transactions (e.g., as stored in the transactions database 303) may be analyzed. In this manner, real transactions may be used to make synthetic transactions appear more realistic. The authentication questions database 305 may additionally and/or alternatively comprise historical authentication questions. For example, the authentication questions database 305 may comprise code that, when executed, randomly generates an authentication question, then stores that randomly-generated authentication question for use with other users.

The authentication questions stored in the authentication questions database 305 may be associated with varying levels of difficulty. For example, straightforward answers that should be easily answered by a user (e.g., "What is your mother's maiden name?") may be considered easy questions, whereas complicated answers that require a user to remember past transactions (e.g., "How much did you spend on coffee yesterday?") may be considered difficult questions. Authentication might be premised on answering a sufficient number of hard questions, easy questions, or some combination thereof. For example, access to an account might be premised on a user answering either one hard question or three easy questions.

The merchants database 306 may store data relating to one or more merchants, including indications (e.g., names) of merchants, aliases of the merchants, locations of the merchants, and the like. That data may be used to generate authentication questions that comprise both correct answers (e.g., based on data from the transactions database 303 indicating one or more merchants where a user has in fact conducted a transaction) and synthetic transactions (e.g., based on data from the merchants database 306, which may be randomly-selected merchants where a user has not conducted a transaction). As will also be described below, the data may also be used to identify references to merchants in text data. For example, as part of processing text data received as part of a user response, portions of the text data might be used to search the merchants database 306 for matching merchants. In this manner, users need not enter the legal name for a merchant. For example, a user may input text data such as "Joe's," and data in the merchants database 306 may be used to determine that the user is informally referring to "Joe's Crab Shack LLC" or the like.

The machine learning server 307 may provide one or more machine learning models which may, e.g., be implemented using the machine learning software 127 and/or the deep neural network 200. Such machine learning models may be trained using training data. Training data may comprise tagged data, such as sets of data that have been tagged with optimal output from the machine learning model. For example, training data may comprise a listing of various merchants (including their location, merchant category, and the like) and tagged indications of their overall popularity and/or their popularity in a geographical region. The popularity number assigned to each business may be generated by determining how many accounts (e.g., overall and/or accounts associated with a particular location) have a transaction associated with that business. Thus, for example, a business that 90% of users shop at may have a popularity of 0.9. As another example, a business may be fairly unpopular at state level (e.g., 1% of users associated with a state have a transaction there), but very popular at a city level (e.g., 60% of users associated with a particular city have a transaction there). To solve this issue, multiple popularity figures may be associated with each business (e.g., 0.01 for a state level, 0.6 for a city/local level). In this manner, the machine learning model may be trained to identify what sort of merchants (e.g., what type of stores) are popular overall and/or in particular locations and, in turn, which merchants may be easily guessed by a malicious user trying to guess where another user has likely shopped. Additionally and/or alternatively, the training data may include locations of every merchant, data indicating the local density of businesses in the corresponding location for the merchant, data indicating how common the words used in the name of a business are (e.g., a store called "Bagel Stop" may be tagged with data indicating that both "bagel" and "stop" are common words, whereas a restaurant called "Caballo" may be tagged with data indicating that the name is uncommon), and other such data that may tend to indicate whether one business is more guessable than another. After all, it may be easy for a malicious user to guess that the average user shops at popular online shopping websites and/or stores with generic names, but not that the same user regularly shops at a tiny bagel store with a unique name near their office. After such training, the trained machine learning model may be provided input data comprising an indication of a first merchant, and the trained machine learning model may provide, as output, an indication of a guessability of (e.g., a popularity of) the first merchant. In other words, the trained machine learning model might provide its estimation of the popularity of an unknown merchant, which thereby might be used by a computing device to infer how guessable that merchant might be. Additionally and/or alternatively, one or more separate machine learning models may be trained to identify a uniqueness of a merchant. As used in this context, uniqueness may be, for example, how different a merchant is from other merchants (e.g., in the same geographical location, in the same merchant category, or the like), how similar the merchant's name is to other merchants, how the common the words in the merchant's name are, and/or the like. In this manner, like guessability, the uniqueness associated with a merchant may indicate how easily a malicious user could guess that another user shopped at the merchant. To train to output indications of perceived uniqueness, a machine learning model may be trained using training data that comprises indications of a plurality of different merchants, including their location, merchant category, and the like. In this manner, the trained machine learning model may be configured to indicate how similar an input merchant is to merchants processed as part of the training data.

Having discussed several examples of computing devices which may be used to implement some aspects as discussed further below, discussion will now turn to a method for receiving and analyzing user responses to authentication questions.

Figure 4:
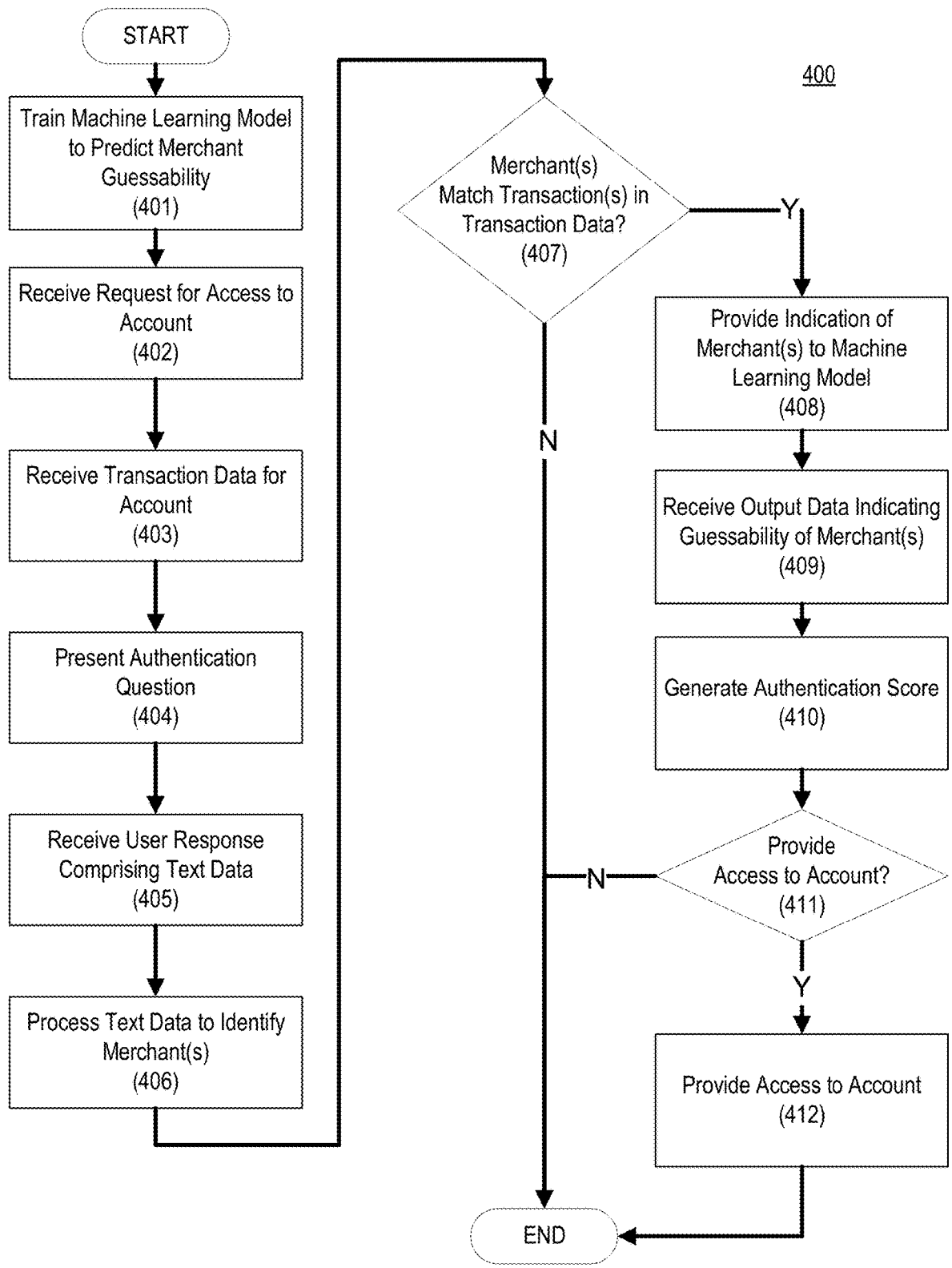
FIG. 4 depicts a flow chart comprising steps which may be performed for receiving, in response to an authentication question, a user response comprising text data.

FIG. 4 illustrates an example method 400 for receiving and analyzing user responses to authentication questions in accordance with one or more aspects described herein. The method 400 may be implemented by a suitable computing system, as described further herein. For example, the method 400 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 4. The method 400 may be implemented in suitable program instructions, such as in machine learning software 127, and may operate on a suitable training set, such as training set data 129. The method 400 may be implemented by computer-readable media that stores instructions that, when executed, cause performance of all or portions of the method 400. The steps shown in the method 400 are illustrative, and may be re-arranged or otherwise modified as desired.

In step 401, the computing device may train a machine learning model to predict a merchant guessability. The machine learning model (which may be, e.g., provided via the machine learning software 127, the deep neural network 200, and/or the machine learning server 307) may be trained with training data. That training data might comprise information about a plurality of different merchants. For example, the computing device may train a machine learning model to predict a guessability of an input merchant by providing, to the machine learning model, training data indicating a popularity of various merchants and/or various other data that tends to affect guessability of each merchant. As another example, the training data may comprise a history of transactions conducted by a plurality of different users at various different merchants. The machine learning model may thereby learn what properties of merchants (e.g., their merchant category, their name, their location) make those merchants particularly popular and, by inference, particularly guessable. In this manner, the machine learning model need not maintain a formal (and potentially old and/or inaccurate) list of which merchants are popular (and, e.g., guessable) or not: rather, the machine learning model may be configured to indicate whether properties of an input merchant (e.g., its name, its location, whether or not it is similar to other merchants) make it likely to be popular and, thus, guessable, and may provide output along those lines.

Guessability with respect to a merchant may refer to any objective or subjective indication of the ability of a user (e.g., a malicious user) to guess that transaction data for an account comprises the merchant. In some circumstances, the guessability of a particular merchant may be related to its popularity and/or its public perception. For example, a merchant that manages a massive popular online shopping website might be very guessable because it might be assumed that many accounts (e.g., credit card accounts) have been used to conduct transactions on that website. Merchants may be considered very guessable if they are popular in a particular geographic region, such as in the United States, a particular state, and/or a particular city. For example, a popular coffee chain may be so popular that it may be easy to guess that the average account has been used at the coffee chain. Merchants may be considered very guessable if they are popular on the Internet. For example, popular online shopping websites may be very guessable in that many users may shop at the popular online shopping websites.

The training data may indicate a popularity of the various merchants in different geographic regions. While some stores (e.g., certain coffee chains) may be popular in some areas of the United States, different stores (e.g., different coffee chains) may be popular in other portions of the United States. As such, a different merchant may be popular (and guessable) depending on a location associated with an account. By providing the training data in a manner which indicates the popularity of various merchants in different geographic regions, the machine learning model may be configured to determine a whether an input merchant is likely to be popular based, in part, on its geographical location. In this manner, the trained machine learning algorithm may be capable of identifying whether a merchant is likely to be guessable (e.g., whether the merchant is popular) based on the location of that merchant.

In step 402, the computing device may receive a request for access to an account. For example, the computing device may receive, from a user device, a request for access to an account. The request may be associated with access, by a user, to a website, an application, or the like. The request may additionally and/or alternatively be associated with, for example, a user device calling into an Interactive Voice Response (IVR) system or similar telephone response system. For example, the computing device may receive an indication of a request for access to an account responsive to a user accessing a log-in page, calling a specific telephone number, or the like. The request may specifically identify an account via, for example, an account number, a username, or the like. For example, a user may call an IVR system and be identified (e.g., using caller ID) by their telephone number, which may be used to query the user account database 304 for a corresponding account.

In step 403, the computing device may receive transaction data for the account. The transaction data may be received from the transactions database 303, and may relate to a particular account. For example, the computing device may receive transaction data associated with the account. The transaction data may indicate a plurality of transactions, and each transaction of the plurality of transactions may be associated with a merchant. For example, the transaction data may indicate a plurality of different transactions (e.g., purchases of goods and/or services) associated with an account over a period of time (e.g., the last month). As another example, each of the plurality of transactions may have been conducted at one or more merchants (e.g., a coffee shop, a shopping mall, etc.) and may have been conducted by one or more of a plurality of different authorized users of the account (e.g., one or more of three different users that share a checking account).

In step 404, the computing device may present an authentication question. The authentication question may prompt a user to provide an indication of one or more merchants. For example, the computing device may present, to the user device, an authentication question that prompts a user to identify one or more merchants indicated by the transaction data. The computing device may present the authentication question through a user interface, such as through a website and/or software application. For example, the computing device may present the authentication question as part of a website, which may thereby prompt a user to provide a response by entering text or selecting a button. The computing device may additionally and/or alternatively present the authentication question in an audio format. For example, the computing device may present the authentication question in an audio form over a telephone call, which may thereby prompt a user to respond to the authentication question with speech.

The computing device may provide a text input field along with the authentication question, such that user response(s) are received via the text input field. For example, the computing device may ask the user "Where did you shop recently?" and provide a text input field, such that the user may provide a response by typing out information into the text input field. Such a text input field may be provided in any manner that permits a user to freely provide a response using a keyboard, voice input, or the like. For example, the text input field may be a HyperText Markup Language (HTML) "<textarea>" tag, an HTML "<input>" tag, and/or a voice recording applet which records the user's voice (e.g., as captured through a microphone) and uses speech recognition algorithms to convert captured voice data into text data.

The authentication question may be configured so as to not provide any indication of the account, including whether or not the account is valid. By asking a static question that is not specific to an account (e.g., by asking "Where have you shopped recently?" instead of "Did you recently shop at Ron's Car Shop?"), malicious users might not be able to glean sensitive information from the manner in which authentication questions are presented. Moreover, the account need not even be valid: for example, the authentication question may be presented even if the user provides incorrect authentication credentials, such that a malicious user cannot use the presentation of an authentication question as an indication that brute-forced authentication credentials are correct.

In step 405, the computing device may receive a user response comprising text data. For example, the computing device may receive, from the user device and in response to the authentication question, a user response comprising text data. Such text data may comprise text that a user has entered in (e.g., typed in using a physical or virtual keyboard), output from a speech recognition algorithm (e.g., output from a speech recognition algorithm that processes speech from a user over the telephone and/or using a microphone of their computer), or the like. The text data may contain a variety of content that does not necessarily answer the authentication question. For example, in the speech recognition context, the text data may comprise pauses, mumbling ("uhh . . . "), stuttering, or meandering words (e.g., "I think the answer is . . . well . . . "). As another example, in the context of web forms, the text data may comprise unnecessary content (e.g., "The answer is . . . ") or, in more extreme circumstances, attempts at Structured Query Language (SQL) injection.

In step 406, the computing device may process the text data to identify one or more merchants. For example, the computing device may process the text data to identify at least one merchant. Processing the text data may comprise use of one or more algorithms, such as natural language processing algorithms, to process the text data. For example, a natural language processing algorithm may process the text data to determine if one or more combinations of characters in the text data correspond to a merchant indicated by data stored by the merchants database 307. Processing the text data may comprise removing one or more elements of the text data, such as portions of the text data associated with SQL injection attacks and/or portions of the text data that are known to not be associated with an answer to an authentication question (e.g., in the speech recognition context, words, phrases, and sounds like "hmm" or "Let's see . . . "). As a result of processing the text data, the computing device may identify one or more merchants by, e.g., their legal name (e.g., "Smith's Grocery LLC"), a slang term for their name ("Smith's"), a merchant identifier (e.g., a unique number that refers to the merchant), or the like.

The computing device may require a new user response if the processed text data suggests that the user response has repeated previously-presented answers. For account security reasons, it may be advisable to prevent a user from answering an open-ended authentication question (e.g., "Where did you shop recently?") with the same answer or set of answers every time. The computing device may store indications of past user responses and, if a current user response has one or more similarities to one or more of the past user responses, the computing device may return to step 404 and require that a user provide a new response. For example, the computing device may determine that a past user response comprised an indication of the at least one merchant. In that situation, the computing device may prompt the user device for an additional merchant different from the at least one merchant.

In step 407, the computing device may determine whether the one or more merchants in the text data correspond to one or more transactions in the transaction data. This step, in some ways, may determine whether a user provided a correct answer (in whole or in part) to the authentication question presented as part of step 404. As such, if the authentication question asked a user to identify merchants in the transaction data (e.g., merchants where the account has been used to conduct a transaction), this process may, in practice, determine whether a user answered the authentication question correctly by determining whether the user correctly identified merchants that are in the transaction data. If the authentication question related to a particular period of time, then the transaction data may be filtered based on that particular period of time. For example, if the authentication question asks "Where did you shop last week?," then step 407 may comprise comparing merchants identified in the text data correspond to any merchants indicated by transactions conducted last week (as reflected by the transaction data received in step 403). If the one or more merchants in the text data correspond to one or more transactions in the transaction data (e.g., such that the user answered the authentication question correctly), the method 400 proceeds to step 408. Otherwise, the method 400 ends. Though the method 400 ends where one or more merchants in the text data do not correspond to one or more transactions in the transaction data, the authentication process need not end: for example, a different form of authentication may be required instead.

As an introduction to step 408 through step 412, though a user may provide a correct answer to an authentication question, the correct answer may have been, in some instances, easy to guess. For example, it may be assumed that most Americans have, in the last month, shopped at certain popular online stores. As such, a malicious user may be able to easily guess that the answer to an authentication question that asks "Where did you shop recently?" is that popular online store. This can be undesirable, as it would allow a malicious user to potentially gain access to an account. To avoid this circumstance, authentication may be conditioned on an authentication score, such that easy answers (e.g., easily guessed answers) are afforded less weight in the score than harder answers (e.g., less easily guessed answers). In turn, to be provided access to an account, a user may be required to provide multiple answers to a question, such as answering multiple merchants. For example, a user may be provided access to an account if their response (e.g., as received in step 405 and processed in step 406) comprises two not-easily-guessable merchants and/or a single easily-guessable merchant and a single not-easily-guessable merchant, but not if their response contains only a single easily-guessable merchant.

In step 408, the computing device may provide an indication of the one or more merchants identified in the text data to the trained machine learning model. The trained machine learning model may be the machine learning model trained in step 401. For example, the computing device may, based on determining that at least one transaction of the plurality of transactions is associated with the at least one merchant, provide, to the trained machine learning model, input data indicating the at least one merchant.

Providing an indication of the one or more merchants identified in the text data to the trained machine learning model may comprise providing the trained machine learning model an indication of a geographic region associated with the account. As indicated above, the popularity (and, e.g., guessability) of a merchant may vary based on its geographic region. As such, to determine whether a particular merchant was easily guessable, the location of the merchant and/or the location of an account may be considered by the trained machine learning model. In this manner, the machine learning model may be configured to recognize that, if the user account and/or the merchant are located in a particular geographic location, the merchant may be more or less guessable.

In step 409, the computing device may receive output data indicating a guessability of the one or more merchants identified in the text data. The output data may comprise any subjective or objective indication that a malicious user may have been able to guess that the transaction data comprises an indication of the one or more merchants (e.g., such that the account was used to conduct one or more transactions at the one or more merchants). For example, the computing device may, based on determining that at least one transaction of the plurality of transactions is associated with the at least one merchant, receive, from the trained machine learning model and in response to the input data, output data indicating a popularity of (and, thereby, a guessability of) the at least one merchant.

In step 410, the computing device may generate an authentication score. The authentication score may be based on a number of merchants (e.g., the merchants identified from the text data in step 406) that correspond to transactions in the transaction data (e.g., as part of step 407). The authentication score may be additionally and/or alternatively be based on output from the machine learning model indicating the guessability of the one or more merchants. For example, the computing device may, based on determining that at least one transaction of the plurality of transactions is associated with the at least one merchant, generate, based on the output data, an authentication score. In this manner, the authentication score may be based on not only an accuracy of the answer(s) provided by a user, but also how easily guessed those answer(s) are.

Generating the authentication score may be based on a uniqueness factor for the one or more merchants identified in the text data. Some merchants may be similar to other merchants, which may in turn make them more or easily guessed by a malicious actor. For example, because many stores may be named some variant of "Convenience Store," guessing that an account was used to conduct a transaction at "Convenience Store" (without more) may be easy as, after all, the store name "Convenience Store" is not particularly unique and is potentially quite guessable. In contrast, longer and more complicated names (e.g., "Joe's Crab Shack and House of Blues") may be quite unique and may thereby be less easily guessed by a malicious actor. A machine learning model (which may be, e.g., provided via the machine learning software 127, the deep neural network 200, and/or the machine learning server 307) may be trained using training data indicating a plurality of different merchants, and may thereby be trained to identify how unique an input merchant name or identifier is as compared to other merchant names/identifiers. The computing device may provide that trained machine learning model input data comprising a merchant name and/or identifier, then receive as output an indication of a potential uniqueness of that merchant (e.g., a uniqueness of the merchant name). For example, the computing device may provide, as input to a second machine learning model trained to generate a uniqueness factor for an input merchant, second input data comprising a first indication of the at least one merchant and a second indication of one or more other merchants. The computing device may then generate the authentication score based on the uniqueness factor. For example, an answer may raise the authentication score higher if the answer pertains to a more unique merchant. In contrast, an answer may raise the authentication score relatively less if the merchant is not very unique.

Generating the authentication score may be based on a commonality factor for the one or more merchants identified in the text data. Because the popularity of a merchant may make that merchant more guessable in response to an authentication question, the overall popularity of that merchant may be considered when determining the authentication score. For example, for a very popular store (e.g., a merchant that is commonly found in transaction data for a wide variety of accounts), the merchant may easily be guessed. The computing device may determine a commonality factor that indicates a frequency of transactions, by a plurality of different users, with the at least one merchant. For example, the commonality factor may represent an objective and/or subjective evaluation of how commonly the merchant is found in transaction data for a wide variety of accounts. Then, the computing device may discount the authentication score based on the commonality factor. For example, if the merchant is commonly found in the transaction data for a wide variety of accounts, the portion of a user response indicating this merchant may be discounted because the merchant may be easily guessed by a malicious user.

Merchants associated with delivery services may be excluded from consideration when calculating the authentication score. Delivery services, such as online food delivery services, typically deliver food from restaurants (e.g., other merchants). This poses at least two problems: first, the users might not recall which delivery service they used (as, after all, they are generally primarily ordering food from a restaurant, not from the delivery service), and second, the delivery services may be easily guessed (as, e.g., they may be quite popular where they are available). In turn, if a merchant is associated with such a delivery service, its inclusion in a user response may be excluded for the purposes of authentication score calculation. The computing device may determine whether a merchant is associated with a delivery service based on data stored by, e.g., the merchants database 306. For example, the computing device may process the text data to identify a second merchant, then, based on determining that the second merchant provides a delivery service, exclude the second merchant from influencing the authentication score. Additionally and/or alternatively, the authentication score may be modified based on the inclusion of the merchant(s) associated with delivery services.

The authentication score may be discounted based on wrong answers. As indicated above, the authentication score may be based on correct answers (e.g., merchants identified in step 406 that correspond to transactions in the transactions data, as indicated by step 407). In turn, incorrect answers (e.g., nonexistent merchants, merchants that do not correspond to transactions in the transactions data) may be associated with a penalty to the authentication score. For example, the computing device may process the text data to identify a second merchant, then discount the authentication score based on determining that the second merchant does not match the transaction data. In this manner, users may be punished for guessing incorrectly.

The authentication score may be modified based on a user response correctly indicating one or more merchants where the account was not used. The steps depicted in the method 400 may be repeated, in whole or in part, for an authentication question that asks a user to identify merchants where an account was not used. For example, the computing device may provide, to the user device, a second authentication question that prompts the user to identify one or more merchants not indicated by the transaction data. That question may be an open-ended question such as, for instance, "Where are some stores you have NOT shopped in the last month?". The presentation of this question may be the same or similar as discussed with respect to step 404. The computing device may then receive, from the user device and in response to the second authentication question, a second user response comprising second text data. This process may be similar to step 405. The computing device may then process the text data to identify a second merchant. This process may be the same as step 406. Based on determining that the second merchant is not associated with any transactions indicated by the transaction data (that is, e.g., the opposite of step 407), the computing device may determine a commonality factor indicating a relative frequency of transactions, by all users, with the second merchant. For example, the computing device may determine whether the merchant identified by the user is one that many users shop at. The computing device may then, in turn, increase the authentication score based on the commonality factor. For example, if a user correctly indicates that they did not shop at a very popular online store recently, the authentication score may be increased. In contrast, if a user correctly indicates that they did not shop at a very unpopular café, then the authentication score might not be increased as much. In this way, the user may be rewarded (in terms of their authentication score) by indicating popular merchants where they did not shop.

In step 411, the computing device may determine whether to provide access to the account. Determining whether to provide access to the account may be based on whether the authentication score in step 410 satisfies a threshold. The threshold may be set by an administrator and/or may be dynamically modified. For example, the threshold may be stricter in circumstances where one or more accounts have recently been attacked by malicious actors. In contrast, the threshold may be more permissive for accounts associated with low dollar values (e.g., children's accounts). If the computing device determines to provide access to the account, the method 400 proceeds to step 412. Otherwise, the method 400 ends.

In step 412, the computing device may provide access to the account. For example, the computing device may, based on determining that at least one transaction of the plurality of transactions is associated with the at least one merchant and based on the authentication score, provide access to the account. Access to the account may be provided by, e.g., providing a user device access to a protected portion of a website, transmitting confidential data to a user device, allowing a user to request, modify, and/or receive personal data (e.g., from the user account database 304 and/or the transactions database 303), or the like.

FIG. 5 depicts examples of an authentication question 501, text data 502, processed text data 503, transaction data 504, and a correlation 505 between a merchant and a transaction. These elements are illustrative, and emphasize some aspects of the method 400 of FIG. 4. To that end, while in some instances represented in the form of a user interface, the elements depicted in FIG. 5 may be data stored by one or more computing devices and may, such as in the case of the authentication question 501, be presented in an audio format or other formats The authentication question 501 asks an open-ended question: "Please name, in the text box below, some of the stores you've shopped at recently." Because the authentication question 501 comprises a text input field, a user may input a variety of different information into the text input field. For example, the user may try to list off merchants in a comma-separated and/or semicolon-separated format, and/or may provide such information in a narrative format (e.g., "I shopped at X and Y and Z last week."). The authentication question 501 may be presented as part of step 404 of the method 400 of FIG. 4.

The text data 502 represents a user response to the authentication question 501. In this circumstance, certain portions of the text data 502 (e.g., "Joe's Crabs," "Bob's," "Smith's Grocery") correspond to merchants, whereas others (e.g., "Last week I shopped at," the commas, and the word "and") do not. The text data may be received as part of the user response received as part of step 405 of the method 400 of FIG. 4.

The processed text data 503 represents the processed form of the text data 502. In particular, the processed text data 503 indicates formal merchant names corresponding to the merchants indicated by the text data 502. In particular, "Joe's Crabs" may refer to "Joe's Crab Shack LLC," whereas "Bob's" may refer to "Bob's Convenience, Inc." In other words, while the user has provided an answer with colloquial references to the merchants, the processed text data 503 may reflect the formal and/or legal names of these merchants. Note that "Smith's Grocery" is not shown in the processed text data 503: this may indicate that there is no such merchant as "Smith's Grocery." As indicated above, this may cause the authentication score for the user to be discounted, as the answer is partially incorrect. The processed text data 503 may reflect output as part of step 406 of the method 400 of FIG. 4.

The transaction data 504 represents transaction data for an account. The transaction data 504 illustrates three transactions: a $60 purchase at "Mike's Brewery" on July 10, a $15 purchase at "Bob's Convenience" on July 11, and a $100 purchase at "Oliver's Garage" on July 12. Such transaction data is illustrative. Indeed, in some circumstances, the transaction data 503 may be longer or shorter than three entries. The transaction data 504 may be the same or similar as the transaction data received as part of step 403 of the method 400 of FIG. 4.

The correlation 505 shows a correlation between the merchant "Bob's Convenience, Inc." and the $15 purchase at "Bob's Convenience" on July 11. As such, the correlation 505 indicates that the user response, including the text data 502, correctly indicated that the account was used to shop at Bob's Convenience. That said, the user response was also incorrect in at least two ways: by identifying a nonexistent merchant ("Smith's Grocery") and by identifying a merchant where the account was not used (e.g., "Joe's Crab Shack LLC"). In such circumstances, the authentication score may positively reflect the correct answer ("Bob's"), but may be discounted based on the incorrect answers ("Joe's Crabs" and "Smith's Grocery"). The correlation 505 may be determined as part of step 407 of the method 400 of FIG. 4.

Figure 6:
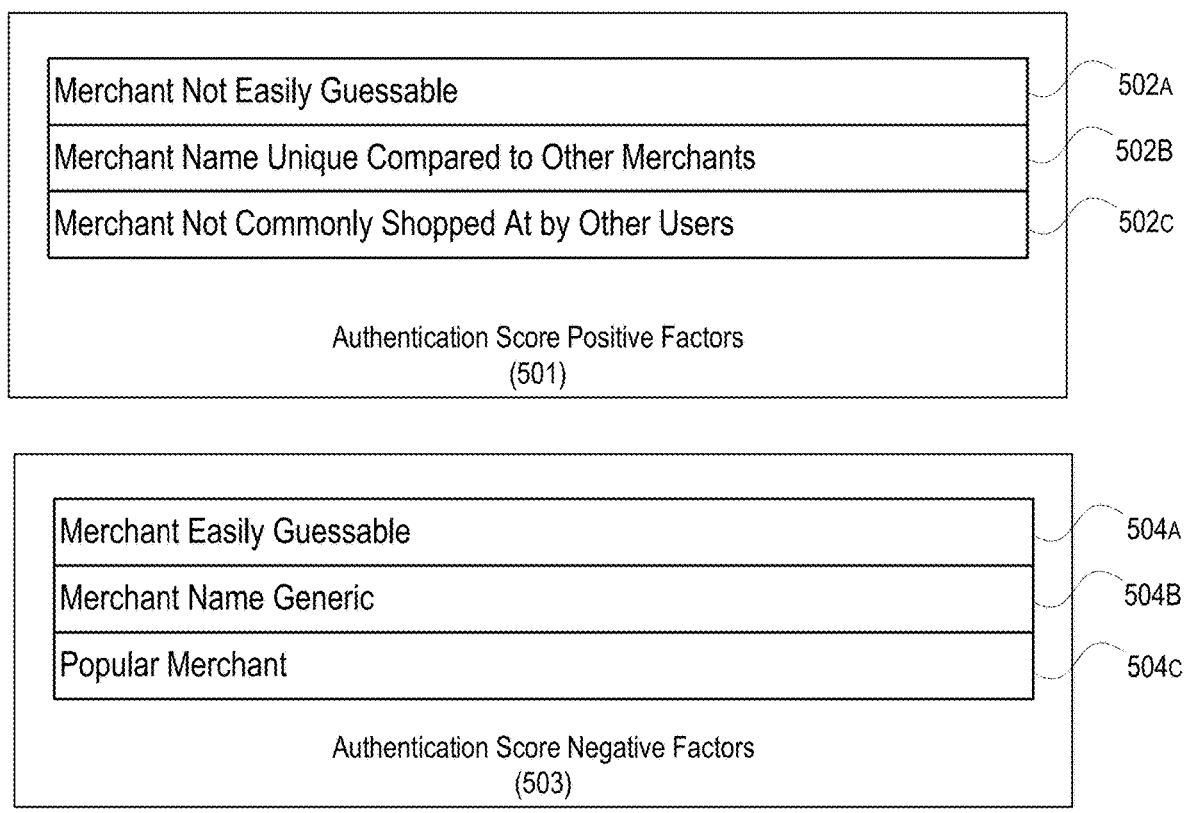
FIG. 6 depicts positive and negative factors for an authentication score.

FIG. 6 depicts example of authentication score positive factors 501 and authentication score negative factors 503. The authentication score positive factors 501 comprises reasons why an authentication score may be positively impacted (and why a user may be provided access to an account). Particularly, the authentication score positive factors 501 include a merchant not easily being guessable (item 502a), the merchant's name being unique as compared to other merchants (item 502b), and the merchant not being commonly shopped at by other users (item 502c). In contrast, the authentication score negative factors 503 include a merchant being easily guessable (item 504a), a merchant name being generic (item 504b), and/or a merchant being popular (item 504c).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining based on a geographical location associated with a user device, training data indicating a plurality of merchants and popularity of each of the plurality of merchants in the geographical location;
   generating, based on the training data, a trained machine learning model by training a machine learning model implemented using an artificial neural network comprising a plurality of nodes to predict a guessability of an input merchant, wherein the training the machine learning model comprises adjusting, based on the training data, one or more weights corresponding to one or more of the plurality of nodes of the artificial neural network;
   receiving transaction data associated with an account, wherein the transaction data indicates a plurality of transactions, and wherein each transaction of the plurality of transactions is associated with a merchant;
   identifying at least one merchant by processing text data of a user response to an authentication question; and
   based on determining that at least one transaction of the plurality of transactions is associated with the at least one merchant:
      providing, to the trained machine learning model, input data indicating the at least one merchant;
      receiving, from the trained machine learning model and in response to the input data, output data indicating a guessability of the at least one merchant;
      generating, based on the output data, an authentication score; and
      providing, to the user device and based on the authentication score, access to the account.

2. The method of claim 1, wherein the training data indicates a popularity of various merchants in different geographic regions.

3. The method of claim 1, wherein generating the authentication score comprises:
   providing, as input to a second machine learning model trained to generate a uniqueness factor for an input merchant, second input data comprising:
      a first indication of the at least one merchant; and
      a second indication of one or more other merchants; and
   generating the authentication score based on the uniqueness factor.

4. The method of claim 1, wherein the generating of the authentication score comprises:
   determining a commonality factor that indicates a frequency of transactions, by a plurality of different users, with the at least one merchant; and discounting the authentication score based on the commonality factor.

5. The method of claim 1, wherein the user response is received via a text input field.

6. The method of claim 1, further comprising:
processing the text data to identify a second merchant; and
discounting the authentication score based on determining that the second merchant does not match the transaction data.

7. The method of claim 1, further comprising:
processing the text data to identify a second merchant; and
based on determining that the second merchant provides a delivery service, excluding the second merchant from influencing the authentication score.

8. The method of claim 1, further comprising:
determining that a past user response comprised an indication of the at least one merchant; and
prompting the user device for an additional merchant different from the at least one merchant.

9. The method of claim 1, further comprising:
providing, to the user device, a second authentication question that prompts the user to identify one or more merchants not indicated by the transaction data;
receiving, from the user device and in response to the second authentication question, a second user response comprising second text data;
identifying a second merchant by processing second text data of a second user response to a second authentication question;
based on determining that the second merchant is not associated with any transactions indicated by the transaction data:
determining a commonality factor indicating a relative frequency of transactions, by all users, with the second merchant; and
increasing the authentication score based on the commonality factor.

10. A computing device comprising:
one or more processors; and
memory storing instructions that, when executed by the one or more processors, cause the computing device to:
determine, based on a geographical location associated with a user device, training data indicating a plurality of merchants and popularity of each of the plurality of merchants in the geographical location;
generate, based on the training data, a trained machine learning model by training a machine learning model implemented using an artificial neural network comprising a plurality of nodes to predict a guessability of an input merchant, wherein the training the machine learning model comprises adjusting, based on the training data, one or more weights corresponding to one or more of the plurality of nodes of the artificial neural network;
receive transaction data associated with an account, wherein the transaction data indicates a plurality of transactions, and wherein each transaction of the plurality of transactions is associated with a merchant; identify at least one merchant by processing text data of a user response to an authentication question; and
based on determining that at least one transaction of the plurality of transactions is associated with the at least one merchant:

provide, to the trained machine learning model, input data indicating the at least one merchant;
receive, from the trained machine learning model and in response to the input data, output data indicating a guessability of the at least one merchant;
generate, based on the output data, an authentication score; and
provide, to the user device and based on the authentication score, access to the account.

11. The computing device of claim 10, wherein the training data indicates a popularity of various merchants in different geographic regions.

12. The computing device of claim 10, wherein the instructions, when executed by the one or more processors, cause the computing device to generate the authentication score by causing the computing device to:
provide, as input to a second machine learning model trained to generate a uniqueness factor for an input merchant, second input data comprising:
a first indication of the at least one merchant; and
a second indication of one or more other merchants; and
generate the authentication score based on the uniqueness factor.

13. The computing device of claim 10, wherein the instructions, when executed by the one or more processors, cause the computing device to generate the authentication score by causing the computing device to:
determine a commonality factor that indicates a frequency of transactions, by a plurality of different users, with the at least one merchant; and
discount the authentication score based on the commonality factor.

14. The computing device of claim 10,
wherein the user response is received via a text input field.

15. The computing device of claim 10, wherein the instructions, when executed by the one or more processors, cause the computing device to:
process the text data to identify a second merchant; and
discount the authentication score based on determining that the second merchant does not match the transaction data.

16. One or more non-transitory computer-readable media storing instructions that, when executed by one or more processors, cause a computing device to:
determine, based on a geographical location associated with a user device, training data indicating a plurality of merchants and popularity of each of the plurality of merchants in the geographical location;
generate, based on the training data, a trained machine learning model by training a machine learning model implemented using an artificial neural network comprising a plurality of nodes to predict a guessability of an input merchant, wherein the training the machine learning model comprises adjusting, based on the training data, one or more weights corresponding to one or more of the plurality of nodes of the artificial neural network;
receive transaction data associated with an account, wherein the transaction data indicates a plurality of transactions, and wherein each transaction of the plurality of transactions is associated with a merchant; identify at least one merchant by processing text data of a user response to an authentication question; and
based on determining that at least one transaction of the plurality of transactions is associated with the at least one merchant:

provide, to the trained machine learning model, input data indicating the at least one merchant;

receive, from the trained machine learning model and in response to the input data, output data indicating a guessability of the at least one merchant;

generate, based on the output data, an authentication score; and provide, to the user device and based on the authentication score, access to the account.

17. The non-transitory computer-readable media of claim 16, wherein the training data indicates a popularity of various merchants in different geographic regions.

18. The non-transitory computer-readable media of claim 16, wherein the instructions, when executed by the one or more processors, cause the computing device to generate the authentication score by causing the computing device to:

provide, as input to a second machine learning model trained to generate a uniqueness factor for an input merchant, second input data comprising:

a first indication of the at least one merchant; and a second indication of one or more other merchants; and generate the authentication score based on the uniqueness factor.

19. The non-transitory computer-readable media of claim 16, wherein the instructions, when executed by the one or more processors, cause the computing device to generate the authentication score by causing the computing device to:

determine a commonality factor that indicates a frequency of transactions, by a plurality of different users, with the at least one merchant; and discount the authentication score based on the commonality factor.

20. The non-transitory computer-readable media of claim 16, wherein the user response is received via a text input field.

* * * * *